No. 709,807. Patented Sept. 23, 1902.
M. J. TODD.
LEVER MECHANISM.
(Application filed Sept. 25, 1901.)
(No Model.)
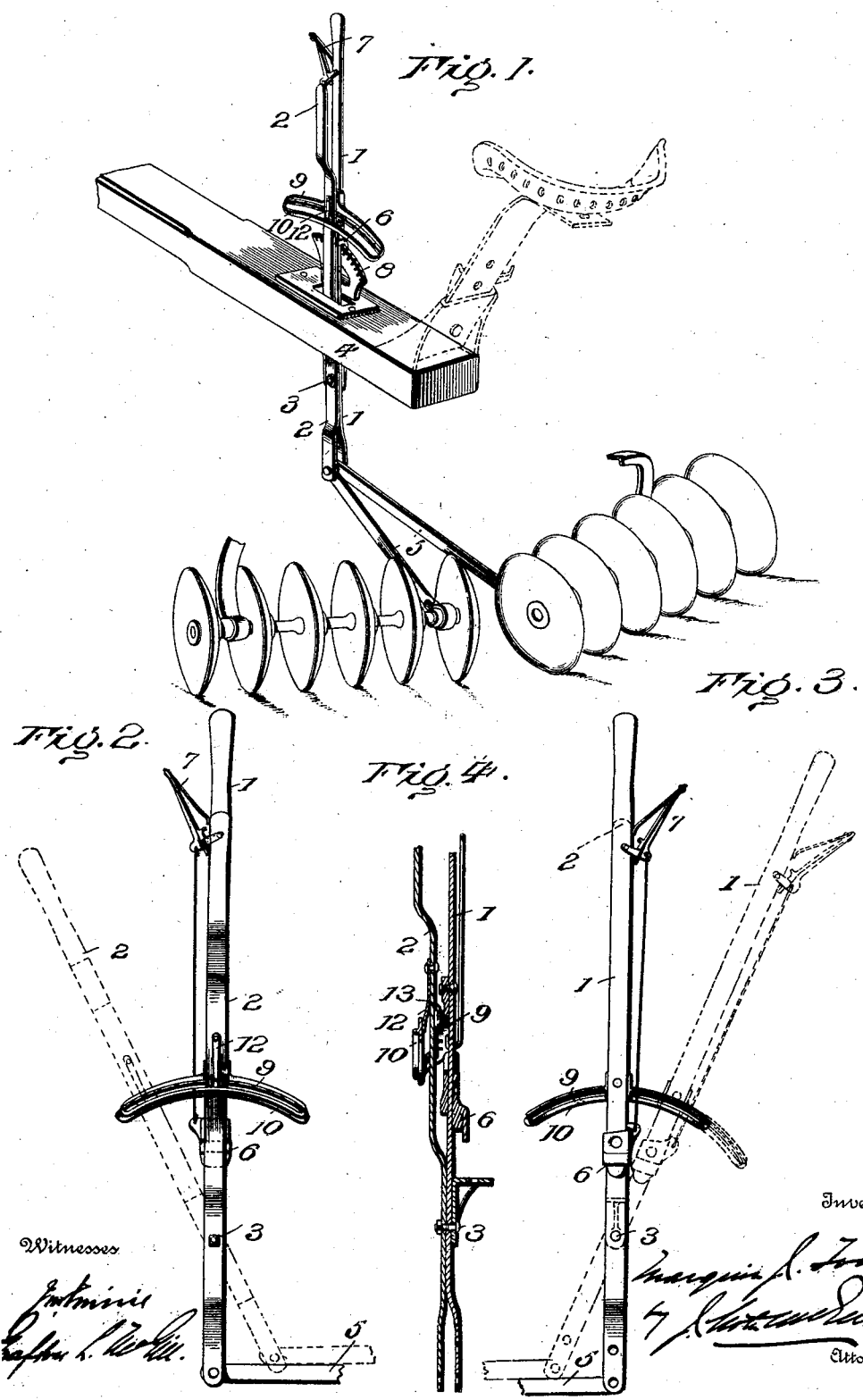

UNITED STATES PATENT OFFICE.

MARQUIS J. TODD, OF BUFFALO, NEW YORK, ASSIGNOR TO BUFFALO PITTS COMPANY, OF BUFFALO, NEW YORK, A CORPORATION OF NEW YORK.

LEVER MECHANISM.

SPECIFICATION forming part of Letters Patent No. 709,807, dated September 23, 1902.

Application filed September 25, 1901. Serial No. 76,481. (No model.)

*To all whom it may concern:*

Be it known that I, MARQUIS J. TODD, of Buffalo, in the county of Erie and State of New York, have invented certain new and useful Improvements in Lever Mechanism; and I do hereby declare the following to be a full, clear, and exact description of the invention, such as will enable others skilled in the art to which it appertains to make and use the same.

This invention contemplates certain new and useful improvements in lever mechanism.

The object of this invention is to provide simple and inexpensive mechanism whereby each of two levers may be operated independently of the other and both may be moved simultaneously by the manipulation of a single lever.

The invention will be hereinafter fully set forth, and particularly pointed out in the claims.

In the accompanying drawings, Figure 1 shows the general outline of a disk harrow equipped with my improvements. Fig. 2 is an enlarged view, in side elevation, showing one lever adjusted independently of the other. Fig. 3 is a similar view showing a like adjustment of the other lever. Fig. 4 is a longitudinal sectional view.

Referring to the drawings, wherein my improvement is shown as applied to a disk harrow, 1 and 2 designate two levers having a common fulcrum 3, (or they may have independent fulcra in axial line,) the levers being shown as passed through the harrow-tongue 4. At their lower ends the levers are shown as being separately connected by adjusting-bars 5 to the disk gangs.

On the main lever 1 is a movable dog 6, under the control of an ordinary hand device 7, such dog by engaging with the stationary toothed segment 8 on tongue 4 locking lever 1 to the tongue. A second toothed segment 9 is mounted on lever 1 for holding the second lever 2 in any position to which it may be adjusted. This segment is shown as having a guiding-bar 10, against which bears a plate-spring 12, the tension of which serves to hold the dog 13 on the opposite side of lever 2 in engagement with the teeth of the segment. With the construction shown by bearing laterally on lever 2 the tension of spring 12 is overcome, and dog 13 will be disengaged from the toothed segment to permit of the adjustment of such lever, and upon releasing the lateral pressure on lever 2 the dog will immediately reëngage the segment, and lever 2 will be held firmly in its adjusted position.

From what has been said it will be seen that upon releasing dog 6 from segment 8 lever 1 may be moved forward or rearward. If lever 2 is in locked engagement with lever 1, both levers will be moved simultaneously. If, however, it be desired to move only lever 1, the operator releases lever 2 from engagement with lever 1 and holds the former while the latter is being adjusted. On the other hand, when it is desired to alone adjust lever 2 lever 1 remains locked, while lever 2 is thrown out of engagement with lever 1 and moved to the desired position. It is obvious that in so far as concerns adjustment of lever 1 independently of lever 2 both elements may remain locked together when being adjusted, and when the desired position is secured for lever 1 the other lever may be moved independently.

The advantages of the invention are apparent to those skilled in the art.

Although I have described my improvements as being especially applicable to disk harrows, yet it is obvious that the invention is not to be restricted to this use.

I claim as my invention—

1. The combination with a main lever, of a lever mounted on one side of and carried by said main lever, said second lever having a tooth on one side, means for holding the main lever, and a segmental rack mounted on such main lever with which the tooth of the other lever engages, said latter lever being movable laterally away from the main lever to disengage the tooth from such segmental rack, as set forth.

2. The combination with a main lever, of a lever mounted on one side of and carried by said main lever, said second lever having a tooth on one side, means for holding the main lever, a segmental rack on one side of such main lever, having a guide-bar parallel therewith, the other lever being movable between such rack and guide-bar, and a
5 spring bearing against the guide-bar for holding the tooth of the lever in engagement with such rack, substantially as set forth.

In testimony whereof I have signed this specification in the presence of two subscribing witnesses.

MARQUIS J. TODD.

Witnesses:
A. B. SPRAGUE,
JOHN B. OLMSTED.